(12) United States Patent
McEnroe et al.

(10) Patent No.: US 11,144,880 B2
(45) Date of Patent: Oct. 12, 2021

(54) DOCUMENT ANALYSIS USING MACHINE LEARNING AND NEURAL NETWORKS

(71) Applicant: AT&T Intellectual Property I, L.P., Atlanta, GA (US)

(72) Inventors: Martin Patrick McEnroe, Plano, TX (US); Andrew Vishnyakov, Frisco, TX (US); Daniel Flynn, Plano, TX (US); Anna Kay Rice, Dallas, TX (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 307 days.

(21) Appl. No.: 16/211,631

(22) Filed: Dec. 6, 2018

(65) Prior Publication Data
US 2020/0184423 A1   Jun. 11, 2020

(51) Int. Cl.
*G06Q 10/10* (2012.01)
*G06N 20/20* (2019.01)
(Continued)

(52) U.S. Cl.
CPC ....... *G06Q 10/1053* (2013.01); *G06F 40/289* (2020.01); *G06N 20/20* (2019.01); *G06Q 10/063112* (2013.01)

(58) Field of Classification Search
None
See application file for complete search history.

(56) References Cited

U.S. PATENT DOCUMENTS

| 6,917,952 | B1 | 7/2005 | Dailey et al. |
| 7,080,057 | B2 | 7/2006 | Scarborough et al. |

(Continued)

FOREIGN PATENT DOCUMENTS

| CN | 105787639 | 7/2016 |
| CN | 107590133 | 1/2018 |

(Continued)

OTHER PUBLICATIONS

Cole, M.S., Feild, H.S. & Giles, W.F. "Interaction of Recruiter and Applicant Gender in Resume Evaluation: A Field Study. Sex Roles" 51, 597-608 (2004) (Year: 2004).*

(Continued)

*Primary Examiner* — Andrew B Whitaker
(74) *Attorney, Agent, or Firm* — Guntin & Gust, PLC; Ralph Trementozzi (57) ABSTRACT

A method for providing training data for a machine learning model includes: monitoring a specific user as the specific user reads electronic documents on a display to determine indications of pauses in reading for greater than a specified period of time; correlating objects on each of the displayed plurality of electronic documents to the pauses in reading; identifying features for the machine learning model based on the objects and textual analysis of each of the plurality of electronic documents; presenting information related to each identified feature to the specific user; obtaining from the specific user a descriptor defining each of the identified features and a value for each of the identified features indicating a relative importance or applicability of each of the identified features; and associating obtained descriptors and values with each of the identified features.

28 Claims, 5 Drawing Sheets

(51) Int. Cl.
*G06Q 10/06* (2012.01)
*G06F 40/289* (2020.01)

(56) References Cited

U.S. PATENT DOCUMENTS

| | | | |
|---|---|---|---|
| 7,472,097 | B1 | 12/2008 | Scarborough et al. |
| 9,280,745 | B1 | 3/2016 | Clark et al. |
| 9,305,286 | B2 | 4/2016 | Larsen et al. |
| 9,305,287 | B2 | 4/2016 | Krishnamoorthy et al. |
| 9,652,745 | B2 | 5/2017 | Taylor et al. |
| 9,818,086 | B2 | 11/2017 | Thankappan et al. |
| 11,030,554 | B2 * | 6/2021 | Polli ............ G06Q 50/20 |
| 2001/0039508 | A1 * | 11/2001 | Nagler ......... G06Q 10/063112 |
| | | | 705/7.14 |
| 2012/0166922 | A1 * | 6/2012 | Rolles ............ G06F 16/958 |
| | | | 715/202 |
| 2012/0290365 | A1 | 11/2012 | Bramlett, Jr. et al. |
| 2013/0054622 | A1 * | 2/2013 | Karmarkar ......... G06F 16/436 |
| | | | 707/749 |
| 2013/0311924 | A1 * | 11/2013 | Denker ............ G06F 16/332 |
| | | | 715/771 |
| 2014/0122355 | A1 | 5/2014 | Hardtke et al. |
| 2016/0055426 | A1 | 2/2016 | Aminzadeh et al. |
| 2016/0364691 | A1 | 12/2016 | Foxworthy et al. |
| 2017/0154314 | A1 * | 6/2017 | Mones ............ G06F 16/2462 |
| 2017/0286914 | A1 | 10/2017 | Fang |
| 2017/0300565 | A1 | 10/2017 | Calapodescu et al. |
| 2017/0337518 | A1 | 11/2017 | Fang et al. |
| 2017/0344556 | A1 | 11/2017 | Wu et al. |
| 2017/0357945 | A1 | 12/2017 | Ashkenazi et al. |
| 2018/0096307 | A1 | 4/2018 | Fortier et al. |
| 2018/0130024 | A1 | 5/2018 | Fang et al. |
| 2018/0196783 | A1 * | 7/2018 | Dey ............... G06F 3/013 |

FOREIGN PATENT DOCUMENTS

| | | |
|---|---|---|
| GB | 2499827 | 9/2013 |
| GB | 2556406 | 5/2018 |
| IN | 201741016081 | 5/2017 |
| WO | 2013165923 | 11/2013 |

OTHER PUBLICATIONS

Supercharge Your Job Platform, Available online at: https://web.archive.org/web/20170901073327/https://opening.io/match, Sep. 1, 2017, 3 pages.
Akinyede et al., Neural Network Web-Based Human Resource Management System Model (NNWBHRMSM), 1 Int'l J. of Computer Networks & Comm. Security, vol. 1, No. 3, Available on Internet at: http://www.ijcncs.org/published/volume1/issue3/p2_1-3.pdf, Aug. 2013, pp. 75-87.
Ali et al., Business Analytics: Web-Based Tool for Resume Screening Using Artificial Neural Networks Over Cloud Computing, Available on Internet at: https://www.ikbooks.com/home/samplechapter?filename=290_9789384588946.pdf, 7 pages.
Bloomberg, Artificial Intelligence is Coming for Hiring, and it Might Not be that Bad, Aug. 9, 2018, 3 pages.
Cabrera-Diego et al., How Can We Measure the Similarity Between Resumes of Selected Candidates for a Job, Int'l Conf. Data Mining, 2015, pp. 99-106.
Ed, Can a Neural Network Predict if you'll get Interviewed?, Available on Internet at: https://www.untapt.com/industry/2016/06/20/neural-network-that-predicts-interview/, Jun. 20, 2016, 4 pages.
Fang, Learning to Rank Candidates for Job Offers Using Field Relevance Models, University of Groningen and Saarland University, Aug. 2015, 82 pages.
Gutierrez, How Machine Learning Will Transform the Way Employers and Candidates Connect, Available on Internet at: https://insidebigdata.com/2016/07/02/how-machine-learning-will-transform-the-way-employers-and-candidates-connect/, Jul. 2, 2016, 2 pages.
Kozan, Talent Acquisition Innovation: Resume Screening Using AI, Available on Internet at: https://towardsdatascience.com/talent-acquisition-innovation-resume-screening-using-ai-78266e6d49cc, Nov. 15, 2016, 3 pages.
Lin et al., Machine Learned Resume-Job Matching Solution, Available on Internet at: https://www.researchgate.net/publication/305654771_Machine_Learned_Resume-Job_Matching_Solution, Jul. 2016, 8 pages.
Maheshwary et al., Matching Resumes to Jobs via Deep Siamese Network, Available on Internet at: https://dl.acm.org/citation.cfm?id=3186942, Apr. 23-27, 2018, pp. 87-88.
Miller, Can an Algorithm Hire Better than a Human?, Available on Internet at: https://www.nytimes.com/2015/06/26/upshot/can-an-algorithm-hire-better-than-a-human.html, Jun. 25, 2015, 5 pages.
Montuschi et al., Job Recruitment and Job Seeking Processes: How Technology Can Help, IEEE Computer Society, IT Professional vol. 16, Issue 5, 2014, pp. 41-49.
Rocabert, Artificial Neural Network System Applied to Human Resource Management, Bachelor's Thesis, Available on Internet at: https://upcommons.upc.edu/bitstream/handle/2117/109555/ann-system-applied-to-hrm-anna-farres-tfg.pdf?sequence=1&isAllowed=y, Sep. 2017, 96 pages.
Sayfullina et al., Domain Adaptation for Resume Classification Using Convolutional Neural Networks, Available on Internet at: https://www.researchgate.net/publication/318527980_Domain_Adaptation_for_Resume_Classification_Using_Convolutional_Neural_Networks, Jul. 2017, 11 pages.
We took AI Out of the Lab so you can Focus on Human, Riminder Technology, Accessed from internet on: https://www.riminder.net/technology, Sep. 25, 2018, 6 pages.

* cited by examiner

DOCUMENT ANALYSIS USING MACHINE LEARNING AND NEURAL NETWORKS

BACKGROUND

Unless otherwise indicated herein, the materials described in this section are not prior art to the claims in this application and are not admitted to be prior art by inclusion in this section.

Despite advances in resume screening, hiring managers are deluged with resumes for which the hiring managers quickly and easily determine that the candidate is clearly not a match for the position. Frequently, hiring practice rules require a justification as to the reason a candidate was not selected; however, this does not improve the resume screening process. Furthermore, a new manager may need to rely on other more experienced managers to help screen resumes and learn how certain phrases obscure the actual experience of a candidate. These phrases may become obvious to one experienced with the interview process, but may not be initially detected on the resume by one without such experience. Finally, it is difficult for any one person (e.g., a resume screener) to remember the types of candidates a particular manager would like for a particular job when there are a number of managers or a number of jobs.

Hiring is critical to the success of an organization. Initial resume screening is an activity that is ripe for neural network screening based on individual and collective management supervision, where supervision includes the labeling of resume components as input to the neural network. Resume screening is only one example. Other types of document analysis may also benefit from neural network screening.

SUMMARY

Systems and methods for a machine learning neural network for scaling resume scanning and amplifying human manager analysis are provided.

According to various aspects there is provided a method for providing training data for a machine learning model. In some aspects, the method may include: displaying a plurality of electronic documents for evaluation on a display of a computing device; monitoring a specific user as the specific user reads each of the displayed plurality of electronic documents on the display to determine indications of pauses in reading each of the displayed plurality of electronic documents for greater than a specified period of time by the specific user; correlating objects on each of the displayed plurality of electronic documents to the pauses in reading by the specific user; identifying features for the machine learning model based on the objects and textual analysis of each of the plurality of electronic documents; presenting information related to each identified feature to the specific user; obtaining from the specific user a descriptor defining each of the identified features and a value for each of the identified features indicating a relative importance or applicability of each of the identified features; associating obtained descriptors and values with each of the identified features; obtaining from the specific user an overall value for each of the plurality of electronic documents indicating an overall applicability of each of the plurality of electronic documents with respect to specific requirements of the specific user; associating obtained overall values with each of the plurality of electronic documents; and combining the identified features, associated descriptors, associated values, and associated overall values as training data for the machine learning model associated with the specific user.

According to various aspects there is provided a system. In some aspects, the system may include: a plurality of machine learning models and a computer system. Each of the plurality of machine learning models may be trained with initial training data generated by a training method including, for each machine learning model: displaying a plurality of electronic documents for evaluation on a display of a computing device; monitoring a specific user as the specific user reads each of the displayed plurality of electronic documents on the display to determine indications of pauses in reading each of the displayed plurality of electronic documents for greater than a specified period of time by the specific user; correlating objects on each of the displayed plurality of electronic documents to the pauses in reading by the specific user; identifying features for the machine learning model based on the objects and textual analysis of each of the plurality of electronic documents; presenting information related to each identified feature to the specific user; obtaining from the specific user a descriptor defining each of the identified features and a value for each of the identified features indicating a relative importance or applicability of each of the identified features; associating obtained descriptors and values with each of the identified features; obtaining from the specific user an overall value for each of the plurality of electronic documents indicating an overall applicability of each of the plurality of electronic documents with respect to specific requirements of the specific user; associating obtained overall values with each of the plurality of electronic documents; and combining the identified features, associated descriptors, associated values, and associated overall values as training data for the machine learning model associated with the specific user.

The computer system may be configured to accept outputs from each of a plurality of neural networks executing the plurality of machine learning models and perform specified activities based on the outputs of each of the plurality of neural networks. Each machine learning model in a subset of the plurality of machine learning models may be trained using training data based on requirements of a different user. At least one of the subset of the plurality of machine learning models may evaluate a particular electronic document, and based on an evaluation identify at least one aspect of the particular electronic document requiring additional information. An output of the at least one of the plurality of neural networks may cause the computer system to perform an activity to obtain the additional information related to the identified at least one aspect of the particular electronic document.

According to various aspects there is provided a method for evaluating electronic documents using a plurality of machine learning models. In some aspects, the method may include: training the plurality of machine learning models for a plurality of different specific users by a training method including, for each machine learning model: displaying a plurality of electronic documents for evaluation on a display of a computing device; monitoring a specific user as the specific user reads each of the displayed plurality of electronic documents on the display to determine indications of pauses in reading each of the displayed plurality of electronic documents for greater than a specified period of time by the specific user; correlating objects on each of the displayed plurality of electronic documents to the pauses in reading by the specific user; identifying features for the machine learning model based on the objects and textual analysis of each of the plurality of electronic documents; presenting information related to each identified feature to the specific user; obtaining from the specific user a descriptor defining each of the identified features and a value for each of the identified features indicating a relative importance or applicability of each of the identified features; associating obtained descriptors and values with each of the identified features; obtaining from the specific user an overall value for each of the plurality of electronic documents indicating an overall applicability of each of the plurality of electronic documents with respect to specific requirements of the specific user; associating obtained overall values with each of the plurality of electronic documents; and combining the identified features, associated descriptors, associated values, and associated overall values as training data for the machine learning model associated with the specific user; evaluating the electronic documents by each machine learning model of the plurality of machine learning models based on requirements of the specific user of the plurality of different specific users used to train each of the plurality of machine learning models; outputting a value or an indication for the electronic documents by each neural network executing one of the plurality of machine learning models; combining outputs of each neural network with a combiner; and generating a final a score or indication indicating a degree of compliance with combined requirements of the plurality of different specific users based on the combined outputs of the plurality of neural networks.

According to various aspects there is provided a method for providing training data for a machine learning model. In some aspects, the method may include: displaying a plurality of electronic documents for evaluation on a display of a computing device; annotating electronic documents displayed on a display of a computing device with one or more annotations; correlating objects on the electronic documents to at least one of the one or more annotations; identifying features for the machine learning model based on annotated objects and textual analysis of each of the electronic documents; presenting information related to each identified feature to a specific user; obtaining from the specific user a descriptor defining each of the identified features and a value for each of the identified features indicating a relative importance or applicability of each of the identified features; associating obtained descriptors and values with each of the identified features; obtaining from the specific user an overall value for each of the plurality of electronic documents indicating an overall applicability of each of the plurality of electronic documents with respect to specific requirements of the specific user; associating obtained overall values with each of the plurality of electronic documents; and combining the identified features, associated descriptors, associated values, and associated overall values as training data for the machine learning model associated with the specific user.

Other features and advantages should be apparent from the following description which illustrates by way of example aspects of the various teachings of the disclosure.

BRIEF DESCRIPTION OF THE DRAWINGS

Aspects and features of the various embodiments will be more apparent by describing examples with reference to the accompanying drawings, in which.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

In accordance with various aspects of the present disclosure, systems and methods for a machine learning neural network for scaling resume scanning and amplifying human manager analysis are provided. Hiring is critical to the success of an organization. Initial resume screening is an activity that is ripe for neural network screening based on individual and collective management supervision, where supervision includes the labeling of resume components as input to the neural network. The machine learning neural network may recognize information that triggers subconscious bias, thus improving the overall diversity of an organization. Further, using the machine learning neural network a hiring company may no longer need to rely on candidates posting resumes, but instead can reach out and search millions of resumes on databases.

Machine learning technology has wide applicability both for individual companies looking to hire as well as companies that exist as hiring intermediaries (e.g., LinkedIn). A hiring intermediary company could ask a hiring manager subscriber to take a profiling test and based on the resulting profile could search for existing candidate resumes or bios as well as matching new inputs to generate leads for the hiring manager subscriber.

In accordance with various aspects of the present disclosure, multiple special purpose neural networks, i.e., a modular neural network, may be used in combination to provide overall hiring recommendations. The neural network may be, for example, a Long Short Term Memory (LSTM) neural network, a feedforward neural network, Radial Basis Function Neural Network, or another type of neural network. A machine learning model may exist for each individual manager.

Figure 1:
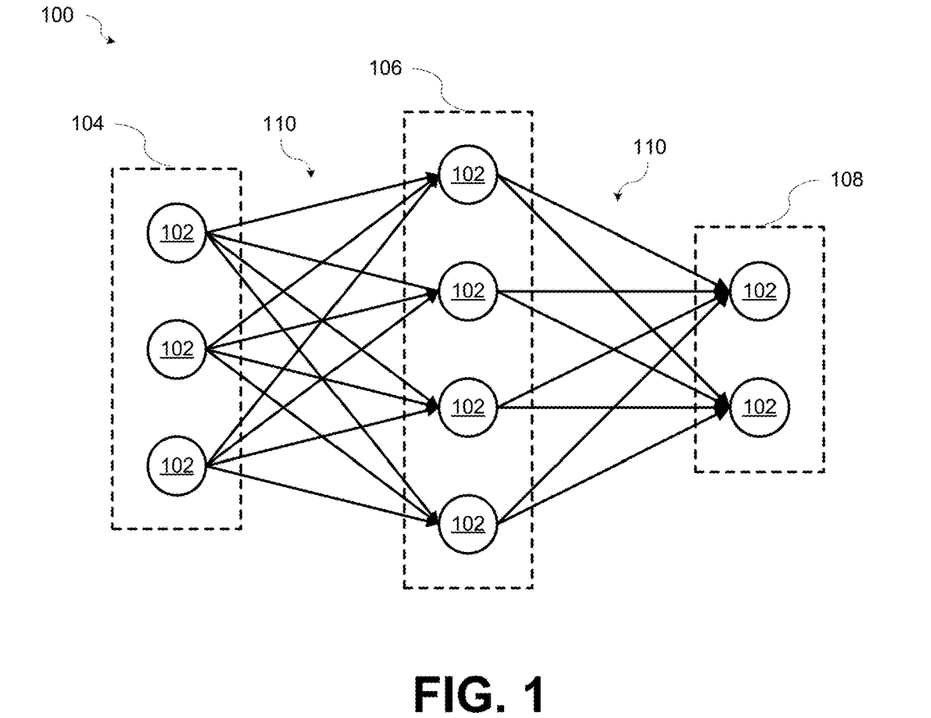
FIG. 1 illustrates an example of visual model for a neural network according to various aspects of the present disclosure.

FIG. 1 illustrates an example of visual model 100 for a neural network according to various aspect of the present disclosure. Referring to FIG. 1, the model 100 includes an input layer 104, a middle layer (i.e., a "hidden" layer) 106, and an output layer 108. Each layer includes some number of nodes 102. The nodes 102 of the input layer 104 are connected to each node 102 of the hidden layer 106. The connections are referred to as weights 110. Each node 102 of the hidden layer 106 has a connection or weight 110 with each node 102 of the output layer. The input layer 104 can receive inputs and can propagate the inputs to the hidden layer 106. A neural network implementation can include multiple hidden layers. Weighted sums computed by the hidden layer 106 (or multiple hidden layers) are propagated to the output layer 108, which can present final outputs to a user.

One of ordinary skill in the art will appreciate that neural network illustrated in FIG. 1 is merely exemplary and that different and/or additional neural networks, for example, but not limited to, LSTM neural networks, feedforward neural network, radial basis function neural network, or other types of neural networks, may be used without departing from the scope of the present disclosure.

To be useful, the neural network requires training. Training the neural network refers to the process of preparing a machine learning model to be useful by feeding it data from which it can learn. The machine learning model may be trained based on requirements of a particular manager with respect to the hiring criteria of a particular position. For example, different managers may have different perspectives regarding qualifications for the same position. Each manager may train a machine learning model with their own requirements. The manager may train the machine learning model by selecting a number of recent resumes, some where the candidate should definitely be interviewed and some where the candidate should definitely not be interviewed. The number of training resumes should be approximately evenly divided between resumes of candidates that definitely should be interviewed and resumes of candidates that definitely should not be interviewed or between resumes of candidates that were hired or successful in the position and resumes of candidates that were not hired or unsuccessful in the position. In some embodiments, a text parsing engine may decompose the training resumes into words, phrases, and sentences. The machine learning models may be routinely retrained based on feedback from new resumes evaluated by the machine learning models, by additional training resumes evaluated by a user, by additional user input based on experiences with hired candidates, etc.

In some embodiments, a dedicated machine learning model may evaluate the requirements or preferences of a new manager to determine a current manager having similar requirements or preferences. By evaluating the requirements of a new manager compared to current managers, a resume scanning machine learning model trained according to the similar requirements may be used as a baseline machine learning model for the new manager. When a new manager would like to use the output of a resume scanning machine learning model, the new manager may perform A/B testing. A/B testing is a way to compare two versions of a single variable, e.g., two words or phrases, by testing a manager's response to word or phrase A against word or phrase B and determining which of the two words or phrases is more effective.

An A/B testing engine may propose various words and phrases and display two words or phrases on a screen. The new manager may view the displayed words or phrases and choose whether the word or phrase displayed on the right or on the left is more effective for a hiring situation, or whether the words or phrases are equivalent. The results of the A/B testing may be fed to a dedicated neural network to determine which resume scanning machine learning model already trained for a current manager may be suitable as a baseline for the new manager. For example, the dedicated machine learning model may evaluate the results of the A/B testing for the new manager and generate an output indicating a current manager having similar requirements to the new manager. The new manager may then begin using an instance of the resume scanning machine learning model used by the identified current manager. The instance of the resume scanning machine learning model used by the new manager may gradually be trained more closely to the requirements of the new manager.

Figure 2:
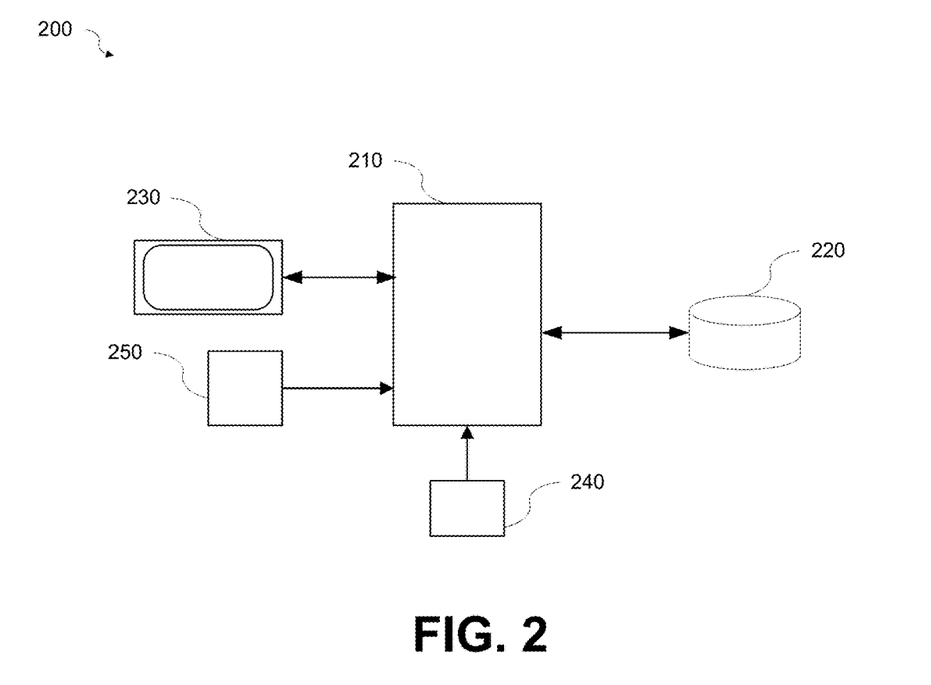
FIG. 2 is block diagram of an example system for collecting training data for a machine learning model according to various aspects of the present disclosure.

In accordance with various aspects of the present disclosure, biometric data and document content context may be used to identify features for training the machine learning models. For example, a pause in reading a document may be interpreted as a user encountering a feature that should be included in training data for a machine learning model. A feature may have an associated descriptor. For example, a feature may be "BSEE" or "MSME" and the associated descriptor for the feature may be "college degree." Different methods, for example, but not limited to, eye movement tracking, touch-sensitive input, audio annotation, etc., may be used individually or in combination to identify and provide training data for a machine learning model. Training data may be generated by a plurality of different users for a plurality of different machine learning models based on requirements of the different users. FIG. 2 is a block diagram of an example system 200 for collecting training data for a machine learning model in accordance with various aspects of the present disclosure. Referring to FIG. 2, the system 200 may include a computer 210, a storage device 220, a display device 230, a user input device 240, and an eye movement tracking device 250.

The computer 210 may be, for example, a laptop computer, a desktop computer, or other mini- or micro-computer. In some embodiments, the computer 210 may be or may include a cloud computing platform. The plurality of machine learning models may be executed on the computer 210 or may be executed on a different computer. The storage device 220 may be a hard disk drive, optical disk drive, or other non-transitory computer-readable storage medium. The plurality of machine learning models may be stored on the storage device 220. The display device 230 may be a video display device capable of displaying electronic documents rendered by the computer 210. The display device 230 may include a touch-sensitive display screen configured to determine a position of a finger or stylus making contact with the touch-sensitive display screen. The display device 230 may further be configured to provide haptic feedback based on an amount of pressure exerted on the touch-sensitive display screen by a finger or stylus.

The user input devices may be one or more of a keyboard, a mouse, a trackball, a joystick, a touch-sensitive display screen, an eye movement tracking device, a stylus, a microphone, a camera, or combinations thereof. The eye movement tracking device 250 may be a non-contact, optical eye movement tracking device or other type of eye movement tracking device.

In some embodiments, eye movement tracking may be used to identify objects (e.g., words, phrases, pictures, etc.) on a document that may be included as training data for a particular user. Eye movement tracking is the process of measuring either the point of gaze (where one is looking) or the motion of an eye relative to the head. An eye tracker is a device for measuring eye positions and eye movement. Some eye trackers, for example video-based eye trackers or other eye movement tracking technologies, use non-contact, optical methods (e.g., reflected light) for measuring eye motion. Based on the light reflected off a user's eyes, a point of regard on a surface, for example the surface of a computer display, can be computed by software.

In accordance with various aspects of the present disclosure, a document, for example, a job application, a resume, an article, etc., may be rendered in electronic form on a display (e.g., the display device 230 of a computer system (e.g., the computer system 200) by a computer (e.g., the computer 210). An eye movement tracking device (e.g., the eye movement tracking device 250) may track the eye movements of a user as the user reads the displayed electronic document and send eye movement tracking information to the computer. Based on the eye movement tracking information, software executing on the computer may compute the position of the user's gaze on the display device.

The system may detect pauses in the user's reading of the electronic document. The computer may determine based on the eye movement tracking information that the user's eyes have not moved for a period of time. For example, the computer may repeatedly receive approximately the same eye movement tracking information indicating that the user's gaze has remained in substantially the same position on the display device. Based on the tracking information received from the eye movement tracking device, the computer may determine that the user has paused reading at a particular location on the display device for a specified period of time, for example, five seconds or another period of time. In accordance with various aspects of the present disclosure, detection of repeated eye movement may be used identify features of a document that may be included as training data for a particular user. For example, detecting eye movements repeatedly between a "skills" section and an "experience" section of a resume to compare skills with experience may identify features for the training data.

The computer may correlate the location on the display device to a portion of the displayed electronic document with a word, phrase, picture, or other object displayed on the electronic document. The computer may perform a textual analysis on the electronic document and identify features for the machine learning model based on the detected objects and the textual analysis. For example, when the electronic document is a resume or job application the computer may identify features related to logical skill development information, career progression information, misleading phrases related to employment experience, gaps in employment history, and/or other relevant features. Associated values for the features may include specific skills, specific position levels (e.g., programmer, lead analyst, supervisor, etc.), specific phrases, number and/or length of employment gaps, etc.

When features are identified, the computer may present information, for example via the display device, regarding the identified features and request additional user input regarding the identified features. The additional user input may be a descriptor that defines the identified feature and a value or an indication of the importance or applicability of the identified feature. For example, a feature may be "BSEE" or "MSME" and the associated descriptor for the feature may be "college degree." The value or indication may be, for example, a numeric value on a scale of one to ten or another indication of the relative importance or applicability of the identified feature. The computer may associate the value with the identified feature. The identified features, descriptors, and the additional user input (i.e., the values or indications) may be combined as training data for the machine learning model. A plurality of features may be identified in each electronic document; however, not all of the electronic documents may contain the same features. Some of the same (i.e., common) features may be identified in each of the electronic documents and some different features may be identified among the electronic documents. Both the common features and the different features may be included in the training data.

Additional user input may also be applied to an overall electronic document to provide a value with respect to specific requirements of the user (e.g., a specific manager). In the context of a job application or resume, the resume may meet some, but not all, of the requirements a manager placed on a particular position. In accordance with various aspects of the present disclosure, a value may be associated with the resume to provide an indication of how close the resume is to meeting the requirements. For example, a scale of one to ten, or another relative indication may be used to assign the value. Thus, for a resume of a candidate that comes close to meeting the job requirements, the manager may assign an overall value of eight to the resume. Conversely, for a resume of a candidate that meets only a few of the job requirements, the manager may assign an overall value of 3 to the resume. The computer may associate the value assigned by the manager with the overall electronic document and the value assigned to the overall electronic document may also become part of the training data for the machine learning model.

In accordance with various aspects of the present disclosure, a value associated with an identified feature may be an indication of unintentional bias. The indication of unintentional bias may be identified and mitigated in subsequent document evaluations performed by the machine learning model. For example, to address unintentional bias various experts such as human resources personnel, members of protected classes, advocates for underrepresented groups, and legal professionals versed in discrimination law may evaluate resumes specifically for trigger phrases, words, grammatical constructions, etc., or specific facts such as attendance at a college or university historically perceived as being targeted to a specific race or gender, to identify items or patterns that might be triggers for bias. As an example, a candidate for whom English is not their primary language may have trouble with plurals and gender pronouns in the English language. However, there are many positions for which these minor grammatical errors may not be critical, such as a position in an engineering lab, although there are some positions where they are relevant, such as public relations. An expert might identify an occurrence of a linguistic characteristic as a potential trigger for unconscious bias. When a manager evaluating a resume shows attention to a minor detail of a missing 's' in a word and rejects the resume or scores it lower, the system can find that correlation with the identified items or patterns indicating bias and suggest a score of potential bias. Since bias is frequently subtle and often unconscious many examples of different types of bias indications may be necessary to determine a manager is looking at characteristics that may not be relevant to a job. Thus, the system may provide the ability to unobtrusively mitigate effects of subtle biases on evaluations.

In some embodiments, the display device may be a touch-sensitive display device and a finger or stylus position on the touch sensitive display device may be used to identify objects on a document that may be included as training data for a particular user. In an embodiment having a touch-sensitive display device, the user may follow the text of each displayed electronic document across the touch-sensitive display with a finger or a stylus in contact with the touch-sensitive display as the user reads each displayed electronic document.

The system may detect pauses in the user's reading of the electronic document based on the movement of the finger or the stylus. The computer may determine based on the touch information received from the touch-sensitive display device that the user's finger or the stylus have not moved for a specified period of time. For example, the computer may repeatedly receive approximately the same touch position information indicating that the user's finger or the stylus has remained in contact at substantially the same position on the touch-sensitive display device and may determine a length of time the contact persists. Based on the touch position information received from the touch-sensitive display device, the computer may determine that the user has paused reading the displayed electronic document at a particular location on the touch-sensitive display device for a specified period of time, for example, five seconds or another period of time. In accordance with various aspects of the present disclosure, detection of repeated finger or stylus movement may be used identify features of a document that may be included as training data for a particular user. For example, detecting finger or stylus movements repeatedly between a "skills" section and an "experience" section of a resume to compare skills with experience may identify features for the training data.

The computer may correlate the location on the touch-sensitive display device to a portion of the displayed electronic document with a word, phrase, picture, or other object displayed on the electronic document. The computer may perform a textual analysis on the electronic document and identify features for the machine learning model based on the detected objects and the textual analysis. For example, when the electronic document is a resume or job application the computer may identify features related to logical skill development information, career progression information, misleading phrases related to employment experience, gaps in employment history, and/or other relevant features.

In some embodiments, the display device may be a touch-sensitive display device configured to provide haptic feedback in response to a specified amount of pressure exerted on the touch-sensitive display device by a finger or a stylus. In an embodiment having a touch-sensitive display device that provides haptic feedback, the user may follow the text of each displayed electronic document across the touch-sensitive display with a finger or a stylus in contact with the touch-sensitive display as the user reads each displayed electronic document.

The system may detect pauses in the user's reading of the electronic document based on the pressure exerted by the finger or the stylus to cause the touch-sensitive display to generate haptic feedback for a specified period of time. The computer may determine based on the touch information received from the touch-sensitive display the location on the touch-sensitive display of the user's finger or the stylus causing the haptic feedback. For example, the computer may receive touch position information indicating that the user's finger or the stylus has exerted pressure in substantially the same position on the touch-sensitive display device to cause haptic feedback and may determine a length of time the haptic feedback persists. Based on the touch position information received from the touch-sensitive display device and the length of time the haptic feedback persists, the computer may determine that the user has paused reading the electronic document at a particular location on the touch-sensitive display device for a specified period of time, for example, five seconds or another period of time. In accordance with various aspects of the present disclosure, detection of repeated finger or stylus movement to cause haptic feedback may be used identify features of a document that may be included as training data for a particular user. For example, detecting finger or stylus movements to cause haptic feedback repeatedly between a "skills" section and an "experience" section of a resume to compare skills with experience may identify features for the training data.

The computer may correlate the location on the touch-sensitive display device to a portion of the displayed electronic document with a word, phrase, picture, or other object displayed on the electronic document. The computer may perform a textual analysis on the electronic document and identify features for the machine learning model based on the detected objects and the textual analysis. For example, when the electronic document is a resume or job application the computer may identify features related to logical skill development information, career progression information, misleading phrases related to employment experience, gaps in employment history and/or other relevant features.

In accordance with various aspects of the present disclosure, displayed electronic documents may be annotated by a user to identify features for training data. A user may mark up an electronic document displayed on a display device (e.g., the display device 230) capable of accepting user input using, for example, a finger, a stylus, or other suitable user input device, to identify features on the electronic document. Standardized mark-up symbols may be defined, for example, underlining objects (e.g., words, phrases, pictures, etc.) on the electronic document to indicate positive aspects, strike-through to indicate negative aspects, circling aspects of the electronic document requiring additional information etc. One of ordinary skill in the art will appreciate that the described mark-up symbols are merely exemplary and that more, fewer, and/or different mark-up symbols may be defined without departing from the scope of the present disclosure. In accordance with various aspects of the present disclosure, if a standard mark-up symbol is not used, the computer may query the user, for example by displaying a message on the display, to determine the meaning of the mark-up.

In some embodiments, the annotations may be audio annotations using a speech recognition engine. The audio annotations may be associated with objects on the electronic document. Standardized phrases may be used to indicate positive and negative aspects of the electronic document or identifying aspects of the electronic document requiring additional information.

The computer (e.g., the computer 210) may correlate the objects on the electronic document to the annotations and interpret the meaning of the annotations with respect to the objects. The computer may perform a textual analysis of the electronic documents. Based on the textual analysis and annotated objects the computer may identify features to be included in the training data for the machine learning model.

When features are identified, the computer may present information, for example via the display device, regarding the identified features and request additional user input regarding the identified features. The additional user input may be a descriptor that defines the identified feature and a value or an indication of the importance or applicability of the identified feature. For example, a feature may be "BSEE" or "MSME" and the associated descriptor for the feature may be "college degree." The value or indication may be, for example, a numeric value on a scale of one to ten or another indication of the relative importance or applicability of an identified feature to a specific employment position as interpreted by a particular user. A similar user input value or indication may also be applied to an overall electronic document. The identified features and the additional user input may be combined as training data for the machine learning model. In some cases, a value associated with an identified feature may be an indication of unintentional bias. The indication of unintentional bias may be identified and mitigated in subsequent document evaluations performed by the machine learning model. For example, items or patterns previously identified by experts as being triggers for bias may be correlated with a value associated with an identified feature and a score of potential bias may be suggested, thereby mitigating the effects of subtle biases on the evaluation.

Figure 3:
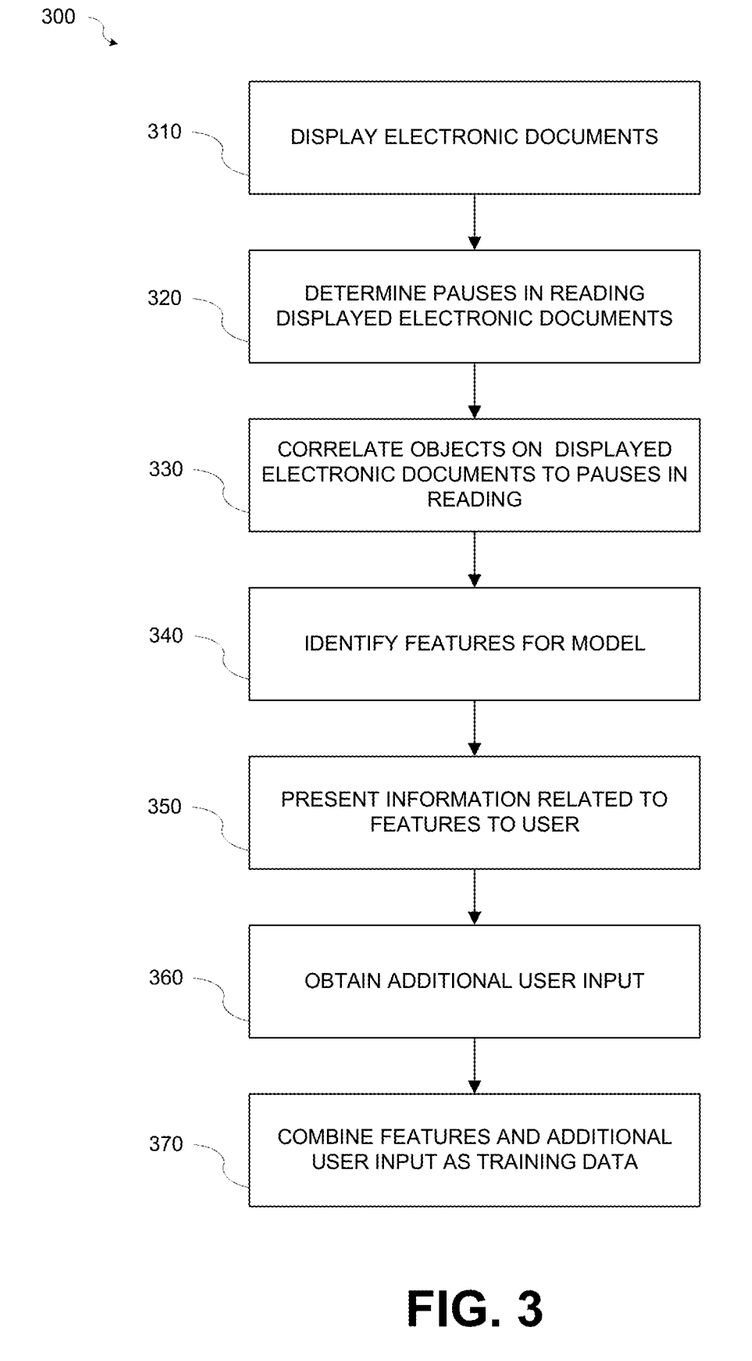
FIG. 3 is a flowchart illustrating a method for providing training data for a machine learning model according to various aspects of the present disclosure.

FIG. 3 is a flowchart illustrating a method 300 for providing training data for a machine learning model in accordance with various aspects of the present disclosure. Referring to FIG. 3, at block 310 an electronic document may be displayed on a display device (e.g., the display device 230 of a computer system (e.g., the computer system 200). The electronic document may be, for example, but not limited to, an employment application, a resume, a published article, etc.

At block 320, when a user is reading a document a pause in the user's reading may be detected. The pause in reading the document may be interpreted as a user encountering a feature that should be included in training data for a machine learning model. In some embodiments, the pause in reading may be detected by an eye movement tracking device (e.g., the eye movement tracking device 250). The computer may receive eye movement tracking information from the eye movement tracking device. Based on the tracking information received from the eye movement tracking device, the computer may determine that the user has paused reading at a particular location on the display device for a specified period of time, for example, five seconds or another period of time. In accordance with various aspects of the present disclosure, detection of repeated eye movement may indicate that the user has paused reading. For example, detecting eye movements repeatedly between a "skills" section and an "experience" section of a resume to compare skills with experience may be interpreted by the computer as a user encountering a feature that should be included in training data.

In some embodiments, the pause in reading may be detected by a finger or stylus position on the touch sensitive display device. A user may follow the text of each displayed electronic document across the touch-sensitive display with a finger or a stylus in contact with the touch-sensitive display as the user reads each displayed electronic document. The computer may repeatedly receive approximately the same touch position information from the touch-sensitive display device and determine based on the touch information that the user's finger or the stylus have not moved for a specified period of time. Based on the touch position information received from the touch-sensitive display device, the computer may determine that the user has paused reading the displayed electronic document at a particular location on the touch-sensitive display device for a specified period of time, for example, five seconds or another period of time. In accordance with various aspects of the present disclosure, detection of repeated finger or stylus movement may indicate that the user has paused reading. For example, detecting finger or stylus movements repeatedly between a "skills" section and an "experience" section of a resume to compare skills with experience may be interpreted by the computer as a user encountering a feature that should be included in training data.

In some embodiments, the pause in reading may be detected by haptic feedback provided by a touch-sensitive display device. A user may follow the text of each displayed electronic document across the touch-sensitive display with a finger or a stylus in contact with the touch-sensitive display as the user reads each displayed electronic document. The touch-sensitive display may generate haptic feedback for a specified period of time as a result of the pressure exerted by the finger or the stylus on the touch-sensitive display. The computer may receive touch position information indicating that the user's finger or the stylus has exerted pressure in substantially the same position on the touch-sensitive display device to cause haptic feedback and may determine that the user has paused reading the electronic document at a particular location on the touch-sensitive display device for a specified period of time, for example, five seconds or another period of time. In accordance with various aspects of the present disclosure, detection of repeated finger or stylus movement to cause haptic feedback may indicate that the user has paused reading. For example, detecting finger or stylus movements to cause haptic feedback repeatedly between a "skills" section and an "experience" section of a resume to compare skills with experience may be interpreted by the computer as a user encountering a feature that should be included in training data.

At block 330, the computer may correlate the location on the display device to a portion of the displayed electronic document with a word, phrase, picture, or other object displayed on the electronic document. At block 340, the computer may perform a textual analysis on the electronic document and identify features for the machine learning model based on the detected objects and the textual analysis. In accordance with various aspects of the present disclosure, different features may be identified for different machine learning models created by different users (e.g., managers). When the electronic document is a resume or job application the computer may identify features related to logical skill development information, career progression information, misleading phrases related to employment experience, gaps in employment history, and/or other relevant features.

At block 350, when features of the electronic document are identified, the computer may present information to the user, for example via the display device, regarding the identified features and may request additional input from the user regarding the identified features. At block 360, additional user input may be obtained. The additional user input may be a descriptor that defines the identified feature and a value reflecting the importance or applicability of the identified feature to a specific employment position as interpreted by a particular user. For example, a feature may be "BSEE" or "MSME" and the associated descriptor for the feature may be "college degree." The value or indication may be, for example, a numeric value on a scale of one to ten or another indication of the relative importance or applicability of the identified feature. The computer may associate the value with the identified feature. A similar user input value or indication may also be applied to an overall electronic document. The computer may associate the value assigned by the manager with the overall electronic document. In some cases, a value associated with an identified feature or an overall value associated with an electronic document may be an indication of unintentional bias. The indication of unintentional bias may be identified and mitigated in subsequent document evaluations performed by the machine learning model. For example, items or patterns previously identified by experts as being triggers for bias may be correlated with a value associated with an identified feature or an overall value and a score of potential bias may be suggested, thereby mitigating the effects of subtle biases on the evaluation.

At block 370, the identified features and the additional user input may be combined as training data for the machine learning model. For example, the identified features, descriptors, and associated values as well as the value assigned to the overall electronic document may be combined as training data for the machine learning model. A plurality of different users may train a plurality of different machine learning models using the method.

It should be appreciated that the specific steps illustrated in FIG. 3 provide a particular method for providing training data for a machine learning model according to an embodiment. Other sequences of steps may also be performed according to alternative embodiments. For example, alternative embodiments may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

The method 300 may be embodied on a non-transitory computer readable medium, for example, but not limited to, a memory or other non-transitory computer readable medium known to those of skill in the art, having stored therein a program including computer executable instructions for making a processor, computer, or other programmable device execute the operations of the methods.

Figure 4:
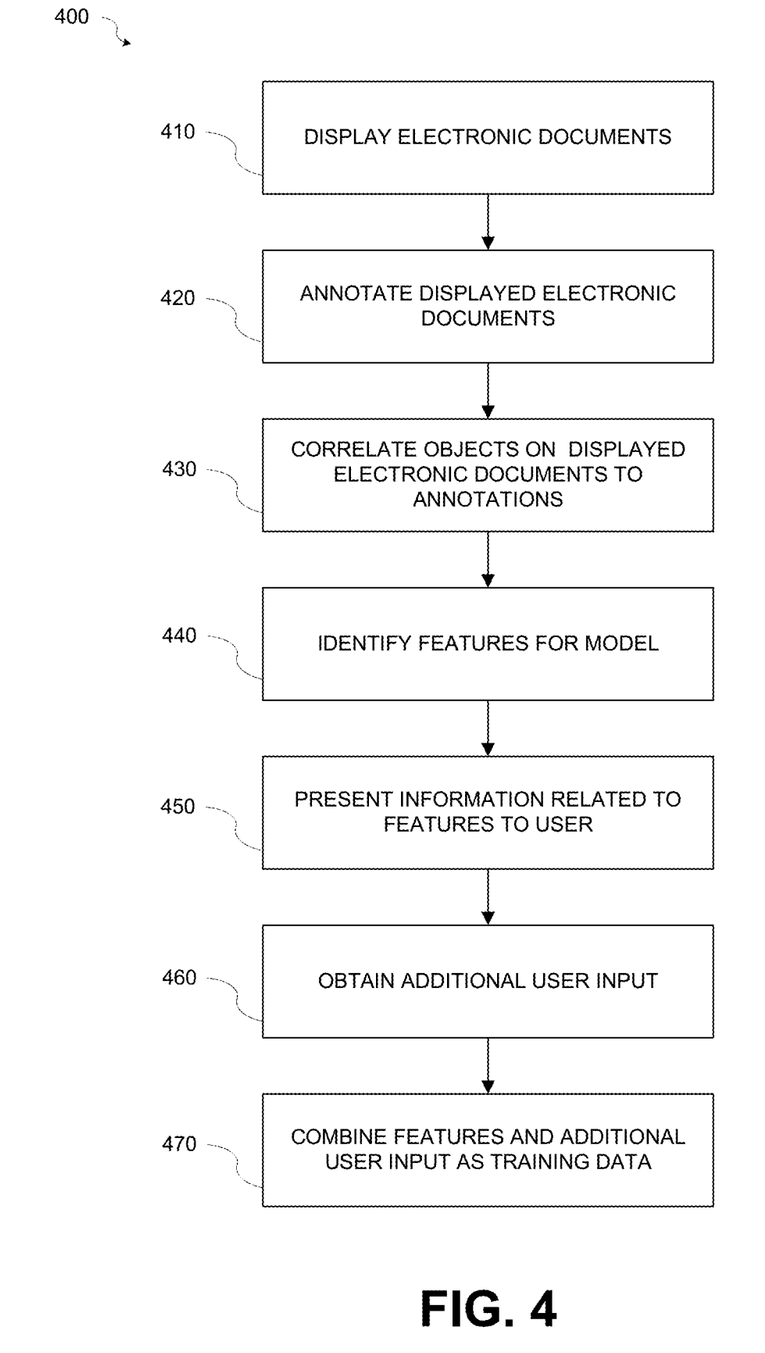
FIG. 4 is a flowchart illustrating a another method for providing training data for a machine learning model according to various aspects of the present disclosure.

FIG. 4 is a flowchart of a another method 400 for evaluating electronic documents using a plurality of machine learning models in accordance with various aspects of the present disclosure. Referring to FIG. 4, at block 410 an electronic document may be displayed on a display device (e.g., the display device of a computer system (e.g., the computer system 200). The electronic document may be, for example, but not limited to, an employment application, a resume, a published article, etc.

At block 420 the displayed electronic document may be annotated. In some embodiments, a user may mark up an electronic document displayed on a display device (e.g., the display device 230) capable of accepting user input using, for example, a finger, a stylus, or other suitable user input device, using defined symbols to identify features on the electronic document. In some embodiments, the annotations may be audio annotations using a speech recognition engine. The audio annotations may be associated with objects on the electronic document. Standardized phrases may be used to indicate positive and negative aspects of the electronic document or identifying aspects of the electronic document requiring additional information.

At block 430 objects on the displayed electronic document may be correlated to the annotations. The computer (e.g., the computer 210) may correlate the objects on the electronic document to the annotations and interpret the meaning of the annotations with respect to the objects. At block 440 features of the electronic document may be identified. The computer may perform a textual analysis on the electronic document and identify features for the machine learning model based on the detected objects and the textual analysis. When the electronic document is a resume or job application the computer may identify features related to logical skill development information, career progression information, misleading phrases related to employment experience, gaps in employment history, and/or other relevant features.

At block 450 information related to the identified features may be presented to the user. The computer may present information to the user, for example via the display device, regarding the identified features and may request additional input from the user regarding the identified features. At block 460 additional user input may be obtained. The additional user input may be a descriptor that defines the identified feature and a value reflecting the importance or applicability of an identified feature to a specific employment position as interpreted by a particular user. For example, a feature may be "BSEE" or "MSME" and the associated descriptor for the feature may be "college degree." The value or indication may be, for example, a numeric value on a scale of one to ten or another indication of the relative importance or applicability of the identified feature. The computer may associate the value with the identified feature.

A similar user input value or indication may also be applied to an overall electronic document. The computer may associate the value assigned by the manager with the overall electronic document. In some cases, a value associated with an identified feature or an overall value associated with an electronic document may be an indication of unintentional bias. The indication of unintentional bias may be identified and mitigated in subsequent document evaluations performed by the machine learning model. For example, items or patterns previously identified by experts as being triggers for bias may be correlated with a value associated with an identified feature or an overall value and a score of potential bias may be suggested, thereby mitigating the effects of subtle biases on the evaluation.

At block 470 the identified features and additional user input may be combined as training data for the machine learning model. For example, the identified features, descriptors, and associated values as well as the value assigned to the overall electronic document may be combined as training data for the machine learning model. A plurality of different users may train a plurality of different machine learning models using the method.

It should be appreciated that the specific steps illustrated in FIG. 4 provide a particular method for providing training data for a machine learning model according to an embodiment. Other sequences of steps may also be performed according to alternative embodiments. For example, alternative embodiments may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

The method 400 may be embodied on a non-transitory computer readable medium, for example, but not limited to, a memory or other non-transitory computer readable medium known to those of skill in the art, having stored therein a program including computer executable instructions for making a processor, computer, or other programmable device execute the operations of the methods.

Figure 5:
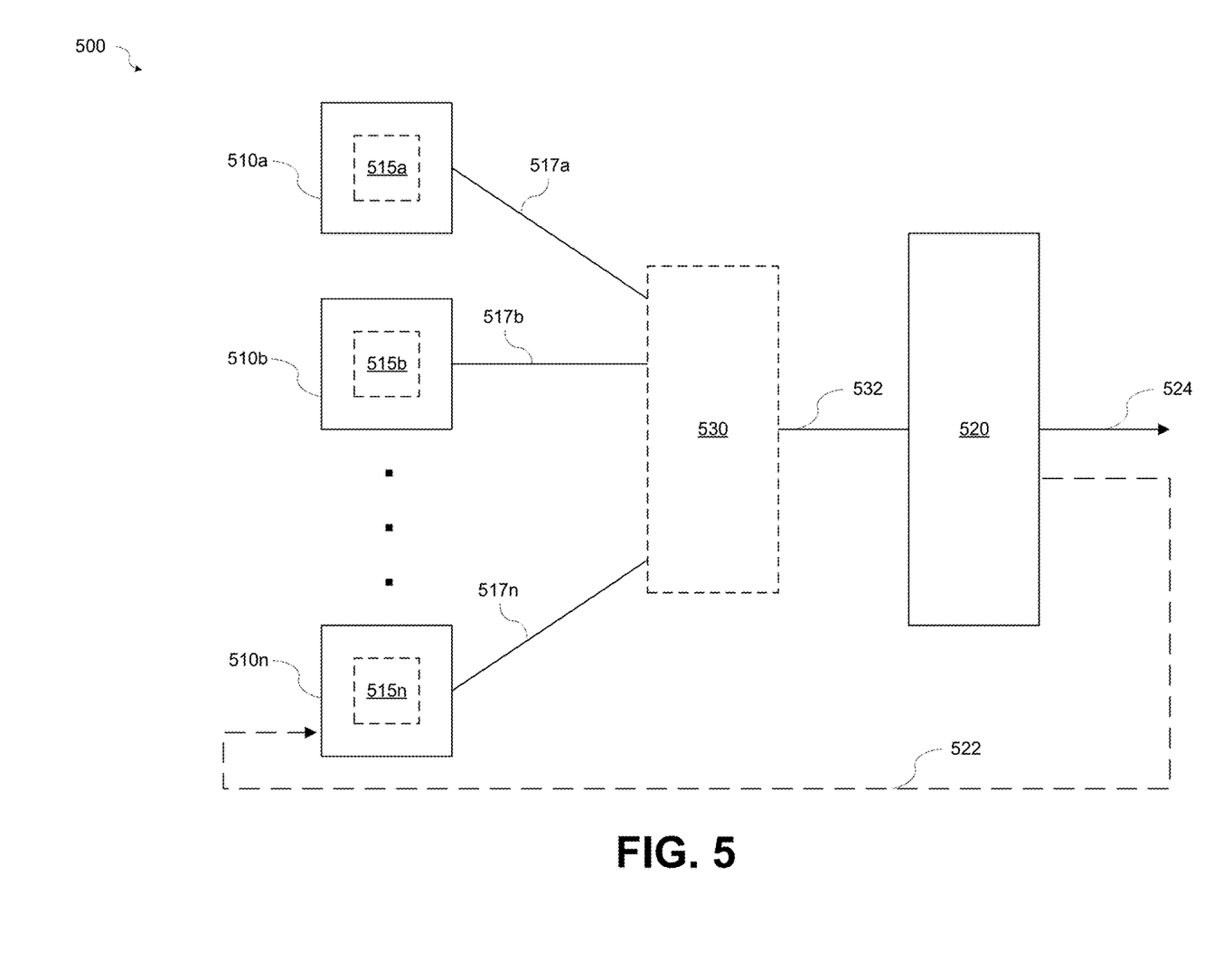
FIG. 5 is a block diagram of an example system for evaluating electronic documents according to various aspects of the present disclosure.

FIG. 5 is a block diagram of an example system 500 for evaluating electronic documents in accordance with various aspects of the present disclosure. Referring to FIG. 5, system 500 may include a plurality of neural networks 510a-510n and a computer system 520. The computer system 520 may include a computer, a storage device, a display device, and one or more user input devices (not shown). The computer may be, for example, a laptop computer, a desktop computer, or other mini- or micro-computer. In some embodiments, the computer may be or may include a cloud computing platform.

In some embodiments one or more of the plurality of neural networks 510a-510n may be part of the computer system 520. In some embodiments the computer system 520 may be a computer system separate from the plurality of neural networks 510a-510n. Each of the plurality of neural networks 510a-510n may execute a machine learning model 515a-515n. Each of the machine learning models 515a-515n may be trained with training data based on requirements of a different user.

At least one of the machine learning models 515a-515n may be trained using training data based on requirements applicable to the subset of the machine learning models 515a-515n. For example, when the machine learning models are trained to evaluate resumes for specific employment openings according to requirements of different users, one of the machine learning models may be trained to evaluate resumes based on general hiring requirements of the company. Resumes may be evaluated sequentially, first based on the general requirements, then by the specific requirements.

While the above example has been described using one machine learning model trained to evaluate resumes based on general hiring requirements before being evaluated for specific requirements, embodiments are not limited to this implementation. In accordance with various aspects of the present disclosure, more than one machine learning mode may be trained based on common requirements, for example, but not limited to, minimum education level, minimum skill level for a category of positions, etc., to sequentially evaluate electronic documents. For example, continuing with the resume evaluation example, in addition to a machine learning model trained based on general hiring requirements, another machine learning model may be trained based on hiring requirements for a specific division of the company, another machine learning model may be trained based on hiring requirements for a particular department within the division, etc. Resumes may be evaluated sequentially by each of the machine learning model. One of ordinary skill in the art would recognize many variations, modifications, and alternatives.

In accordance with various aspects of the present disclosure, the computer system 520 may perform an activity based on an output 517a-517n of at least one of the neural networks 510a-510n. Each of the neural networks 510a-510n may execute a machine learning model 515a-515n based on the requirements of different users to evaluate electronic documents. Based on the evaluations, one or more of the neural networks 510a-510n may output aspects of the electronic documents requiring additional information to the computer system 520. The computer system 520 may perform an activity to obtain the additional information. For example, a machine learning model may evaluate a resume and identify gaps in employment history or other missing information. In some cases, a candidate may be asked to supply information regarding something not found on the resume but is found on other similar resumes. The computer system 520 may perform an activity to obtain the additional information from the candidate.

Upon receiving the output from the neural network, the computer system may generate an information request (e.g., an email) to the candidate that submitted the resume to obtain the required additional information. One of ordinary skill in the art will appreciate that these aspects are merely exemplary and that other aspects may be identified without departing from the scope of the present disclosure. For example, the electronic document may be an article, and the author of the article may be contacted.

When the requested additional information is received by the computer system 520 (e.g., by a return email from the candidate), the computer system 520 may output 522 the additional information as additional training data for the at least one of the plurality of machine learning models that identified the aspect requiring the further information. The electronic document may be reevaluated using the machine learning model modified with the additional training data provided by the additional information. The machine learning model may generate a value or an indication for the electronic document and the neural network may output 524 the value or indication. The value or indication may indicate a degree of compliance with the requirements of the specific user.

Each of the plurality of machine learning models may be configured to determine that the specified requirements used to evaluate an electronic document applied to one or more identified features of the electronic document indicates an unintentional bias. The indications of unintentional bias may be identified and mitigation during subsequent electronic document evaluation. For example, items or patterns previously identified by experts as being triggers for bias may be correlated with a value associated with an identified feature and a score of potential bias may be suggested, thereby mitigating the effects of subtle biases on the evaluation.

In accordance with various aspects of the present disclosure, document screening and interviewing may be combined. An interactive electronic interview process, for example, via Skype, WebEx, or similar interactive audio-video service, involving a manager and candidate at the same time may take place with an intermediary avatar displayed to remove certain characteristics such as race, gender, national origin, or perceived attractiveness from the manager's consideration. In such a scenario, the manager may review the candidate's electronic resume on the display and the system may note that the manager pauses and reviews certain information, for example, the employment dates of the candidate. With or without a verbal annotation, the system may ask the candidate to explain the related aspects of the resume. In addition to or alternative to a verbal response from the candidate, the system may provide a speech-to-text conversion of the response and display the supplemental information provided by the candidate on the document.

Figure 6:
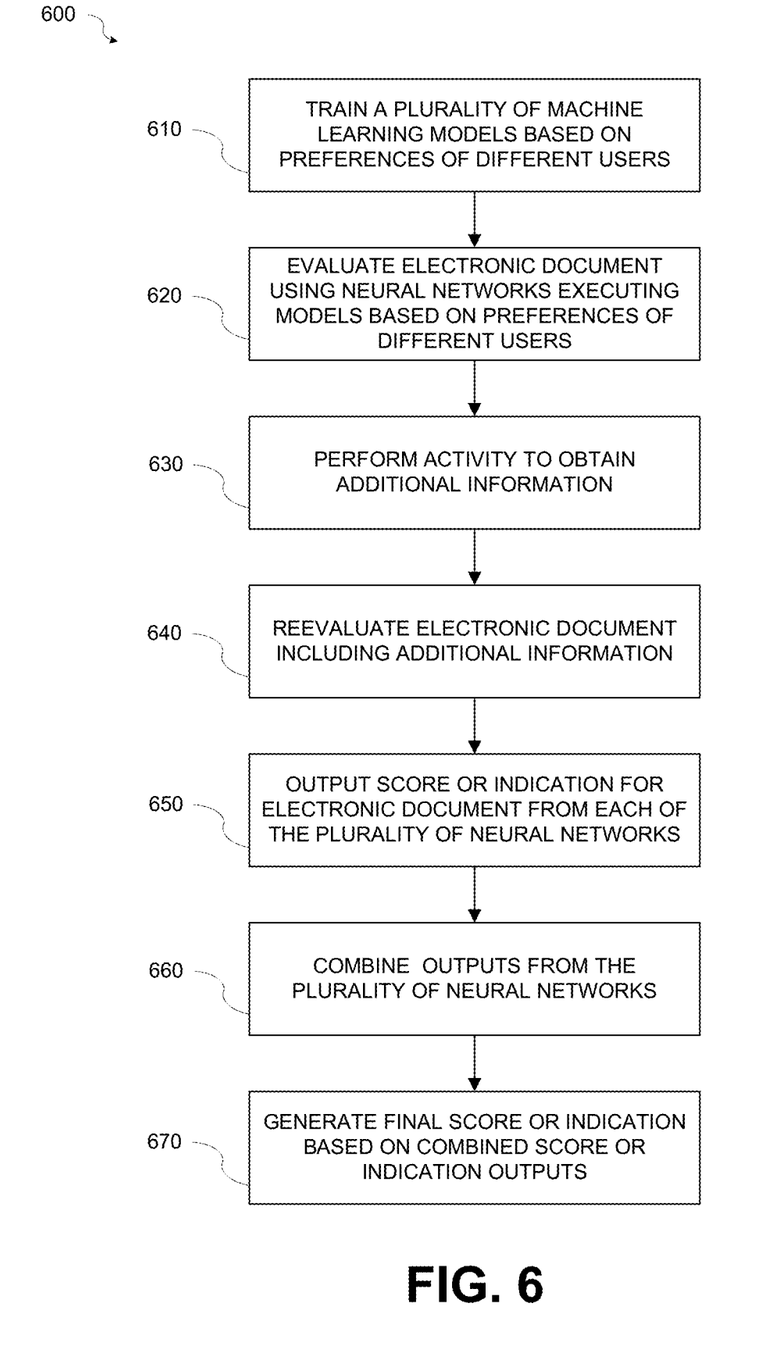
FIG. 6 is a flowchart of a method for evaluating electronic documents using a plurality of machine learning models according to various aspects of the present disclosure.

FIG. 6 is a flowchart of a method 600 for evaluating electronic documents in accordance with various aspects of the present disclosure. Referring to FIG. 600, at block 610, a plurality of machine learning models may be trained. The plurality of machine learning models (e.g., the machine learning models 515a-515n) may be trained, for example, based on the methods described in FIG. 3 or 4, according to the requirements of different users. Each of the plurality of machine learning models may be configured to determine that the specified requirements used to evaluate an electronic document applied to one or more identified features of the electronic document indicates an unintentional bias. The indications of unintentional bias may be identified and mitigated in subsequent electronic document evaluation. For example, items or patterns previously identified by experts as being triggers for bias may be correlated with a value associated with an identified feature and a score of potential bias may be suggested, thereby mitigating the effects of subtle biases on the evaluation.

At block 620, an electronic document may be evaluated by the plurality of neural networks. Each of the plurality of neural networks (e.g., the neural networks 510a-510n) may execute a machine learning model. In some embodiments, at least one of the plurality of machine learning model may be trained using training data based on common requirements, for example, but not limited to, minimum education level, minimum skill level for a category of positions, etc., applicable to the other machine learning models of the plurality of machine learning models. The electronic document may be evaluated sequentially, first by the machine learning model trained using training data based on common requirements, then substantially concurrently by the other machine learning models.

At block 630, an activity may be performed to obtain additional information from a candidate. Each of the neural networks may execute a machine learning model to evaluate electronic document. Based on the evaluations, one or more of the neural networks may output aspects of the electronic documents requiring additional information may be identified to the computer system (e.g., the computer system 520). For example, a machine learning model may evaluate a resume and identify gaps in employment history or other missing information. In some cases, a candidate may be asked to supply information regarding something not found on the resume but is found on other similar resumes. The computer system may perform an activity to obtain the additional information. For example, the computer system may generate an information request (e.g., an email) to the candidate that submitted the resume to obtain the required additional information.

At block 640, the electronic document may be reevaluated including the additional information. When the requested additional information is received by the computer system (e.g., by a return email from the candidate), the computer system may output the additional information as additional training data for the at least one of the plurality of machine learning models that identified the aspect requiring the further information and the electronic document may be reevaluated using the machine learning model modified with the additional training data provided by the additional information.

At block 650, the neural networks may output a value or indication regarding the electronic document. Each of the machine learning models may generate a value or an indication for the electronic document and the neural networks may output the value or indications. The value or indication may indicate a degree of compliance with the requirements of a specific user.

In some embodiments, at block 660, the outputs of each of the plurality of neural networks may be combined. In accordance with various aspects of the present disclosure, the outputs of the plurality of neural networks may be combined in a "committee of machines" approach to evaluating electronic documents. Referring to FIG. 5, a combiner 530 may be included in the system 500 to combine the outputs 515*a*-515*n* of the neural networks 510*a*-510*n*. The combiner 530 may average or weight the outputs of the neural networks by applying averaging or weighting algorithms known to those of skill in the art. The combiner 530 may output 532 the combined outputs of the neural networks to the computer 520. Referring again to FIG. 6, at block 670, a value or indication may be generated based on the combined outputs of the neural network models and output 524 by the computer 520. The value or indication may indicate a degree of compliance with the combined requirements of the users.

In accordance with various aspects of the present disclosure, when a new resume is received the machine learning models may evaluate the content and through the committee of machines approach provide a value or indication for the resume for each machine learning model and also for the combined machine learning models. The value or indication may indicate a degree of compliance with requirements of the individual users and the combined requirements of the users.

It should be appreciated that the specific steps illustrated in FIG. 6 provide a particular method for evaluating electronic documents according to another embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A method for providing training data for a machine learning model, the method comprising:

obtaining a selection from equipment of a specific user responsive presentation of proposed words according to an A/B test;

identifying, by application of the selection to a dedicated neural network, a pre-trained, baseline machine learning model;

displaying a plurality of electronic documents for evaluation on a display of a computing device to obtain a displayed plurality of electronic documents;

tracking, by an eye movement tracking device, a gaze of the specific user as the specific user reads each of the displayed plurality of electronic documents on the display to determine indications of pauses in reading each of the displayed plurality of electronic documents for greater than a specified period of time by the specific user, the pauses indicative of the specific user's gaze;

correlating objects on each of the displayed plurality of electronic documents to the pauses in reading by the specific user;

identifying features for the machine learning model to obtain identified features based on the objects and textual analysis of each of the plurality of electronic documents;

presenting information related to each identified feature to the specific user;

obtaining from the specific user a descriptor defining each of the identified features and a value for each of the identified features indicating a relative importance or applicability of each of the identified features;

associating obtained descriptors and values with each of the identified features;

obtaining from the specific user an overall value for each of the plurality of electronic documents indicating an overall applicability of each of the plurality of electronic documents with respect to specific requirements of the specific user;

associating obtained overall values with each of the plurality of electronic documents; and combining the pre-trained, baseline machine learning model, identified features, associated descriptors, associated values, and associated overall values as training data for the machine learning model associated with the specific user.

2. The method of claim 1, wherein a plurality of same features and a plurality of different features are identified among the plurality of electronic documents.

3. The method of claim 1, further comprising:
determining that a value associated with an identified feature is an indication of bias; and
identifying the indication of bias in the training data for mitigation during subsequent electronic document evaluation.

4. The method of claim 1, wherein the plurality of electronic documents comprise job applications or resumes; and
the features comprise one or more of logical skill development information, career progression information, misleading phrases related to employment experience, and gaps in employment history.

5. The method of claim 1, wherein the objects are one of a word, a phrase, and a picture.

6. The method of claim 1, wherein the determining indications of pauses in reading comprises:
tracking, by the eye movement tracking device, eye positions of the specific user's eyes on each of the displayed plurality of electronic documents as the specific user reads each of the displayed plurality of electronic documents; and
detecting pauses in movement of the specific user's eyes for greater than the specified period of time on a displayed electronic document or detecting repeated eye movements between different portions of the displayed electronic document.

7. The method of claim 6, wherein the correlating of the objects on each of the displayed plurality of electronic documents to the pauses in reading comprises:
determining, based on data from the eye movement tracking device, the eye positions of the specific user's eyes on the display;
correlating portions of each of the displayed plurality of electronic documents with the eye positions of the specific user's eyes; and
identifying the objects corresponding to the portions of each of the displayed plurality of electronic documents.

8. The method of claim 1, wherein the display is a touch-sensitive display,
wherein the eye movement tracking device comprises the touch-sensitive display,
wherein the specific user follows text of each of the displayed plurality of electronic documents across the touch-sensitive display with a finger or a stylus in contact with the touch-sensitive display as the specific user reads each of the displayed plurality of electronic documents, and
wherein a determining of the indications of pauses in reading comprises determining, based on data from the touch-sensitive display, pauses in movement of the finger or the stylus in contact with the touch-sensitive display for the specified period of time.

9. The method of claim 8, wherein the correlating an object on each of the displayed plurality of electronic documents to the pauses in the specific user's reading comprises:

determining, based on the data from the touch-sensitive display, positions on the touch-sensitive display of the finger or the stylus in contact with the touch-sensitive display;
correlating portions of each of the displayed plurality of electronic documents with the positions of the finger or the stylus; and
identifying the objects corresponding to the portions of each of the displayed plurality of electronic documents.

10. The method of claim 1, wherein the display is a touch-sensitive display configured to provide haptic feedback in response to a specified amount of pressure exerted on the display by a finger or a stylus,
wherein the specific user follows text of each of the displayed plurality of electronic documents with the finger or the stylus as the specific user reads each of the displayed plurality of electronic documents, and
wherein a determining of the indications of pause in reading comprises exerting the specified amount of pressure on the touch-sensitive display with the finger or the stylus to generate the haptic feedback for the specified period of time.

11. The method of claim 10, wherein the correlating of the objects on each of the displayed plurality of electronic documents to the pauses in reading comprises:
determining, based on data from the touch-sensitive display, positions of the finger or the stylus exerting the specified amount of pressure on the touch-sensitive display to generate the haptic feedback for the specified period of time;
correlating portions of each of the displayed plurality of electronic documents with the positions of the finger or the stylus; and
identifying the objects corresponding to the portions of each of the displayed plurality of electronic documents.

12. The method of claim 1, further comprising identifying training data for a plurality of different models, each of the plurality of different models trained based on training data identified for a different user.

13. A system, comprising:
a plurality of machine learning models, each of the plurality of machine learning models trained with initial training data generated by a training method including, for each machine learning model:
obtaining a selection from equipment of a specific user responsive presentation of proposed words according to an A/B test;
identifying, by application of the selection to a dedicated neural network, a pre-trained, baseline machine learning model;
displaying a plurality of electronic documents for evaluation on a display of a computing device to obtain a displayed plurality of electronic documents;
tracking, by an eye movement tracking device, a gaze of the specific user as the specific user reads each of the displayed plurality of electronic documents on the display to determine indications of pauses indicative of the gaze of the specific user in reading each of the displayed plurality of electronic documents for greater than a specified period of time by the specific user;
correlating objects on each of the displayed plurality of electronic documents to the pauses in reading by the specific user;
identifying features for the machine learning model to obtain identified features based on the objects and textual analysis of each of the plurality of electronic documents;

presenting information related to each identified feature to the specific user;

obtaining from the specific user a descriptor defining each of the identified features and a value for each of the identified features indicating a relative importance or applicability of each of the identified features;

associating obtained descriptors and values with each of the identified features;

obtaining from the specific user an overall value for each of the plurality of electronic documents indicating an overall applicability of each of the plurality of electronic documents with respect to specific requirements of the specific user;

associating obtained overall values with each of the plurality of electronic documents; and combining the pre-trained, baseline machine learning model, identified features, associated descriptors, associated values, and associated overall values as training data for the machine learning model associated with the specific user; and a processing system including a processor configured to accept outputs from each of a plurality of neural networks executing the plurality of machine learning models and perform specified activities based on the outputs of each of the plurality of neural networks, wherein each machine learning model in a subset of the plurality of machine learning models is trained using training data based on requirements of a different user, wherein at least one of the subset of the plurality of machine learning models evaluates a particular electronic document, and based on an evaluation identifies at least one aspect of the particular electronic document requiring additional information, and wherein an output of the at least one of the plurality of neural networks causes the processing system to perform an activity to obtain the additional information related to the identified at least one aspect of the particular electronic document.

14. The system of claim 13, wherein the particular electronic document comprises a job application or a resume and the additional information relates to one or more of inconsistent logical skill development information, career progression information, and gaps in employment history.

15. The system of claim 14, wherein the activity performed by the processing system caused by an output of the at least one of the plurality of neural networks comprises contacting a candidate that submitted the job application or resume with a request to provide the additional information related to the identified at least one aspect.

16. The system of claim 15, wherein when the additional information is received by the processing system, the processing system outputs the additional information as additional training data for the at least one of the plurality of machine learning models, and wherein based on the initial training data and the additional training data, the at least one of the plurality of machine learning models is configured to generate a value or an indication for the particular electronic document.

17. The system of claim 13, wherein the electronic documents comprise one or more of job applications, resumes, and published articles.

18. The system of claim 17, wherein the activity performed by the processing system caused by an output of the at least one of the plurality of neural networks comprises contacting authors of the published articles or candidates that submitted the job applications or the resumes.

19. The system of claim 13, wherein at least one of the plurality of machine learning models not included in the subset of the plurality of machine learning models is trained using training data based on requirements applicable to the subset of the plurality of machine learning models, and wherein the electronic documents are evaluated sequentially by the at least one of the plurality of machine learning models and then by the at least one of the subset of the plurality of machine learning models.

20. The system of claim 13, wherein each of the plurality of machine learning models is configured to determine that the specific requirements of the specific user used to evaluate an electronic document applied to one or more identified features of the electronic document indicates a bias; and mitigate the bias during subsequent evaluation of the electronic document.

21. A method for evaluating electronic documents using a plurality of machine learning models, the method comprising:

training the plurality of machine learning models for a plurality of different specific users by a training method including, for each machine learning model:

obtaining a selection from equipment of a specific user responsive presentation of proposed words according to an A/B test;

identifying, by application of the selection to a neural network, a pre-trained, baseline machine learning model;

displaying a plurality of electronic documents for evaluation on a display of a computing device to obtain displayed plurality of electronic documents;

tracking, by an eye movement tracking device, a gaze of the specific user as the specific user reads each of the displayed plurality of electronic documents on the display to determine indications of pauses in reading each of the displayed plurality of electronic documents for greater than a specified period of time by the specific user, wherein the pauses are indicative of the gaze of the specific user;

correlating objects on each of the displayed plurality of electronic documents to the pauses in reading by the specific user;

identifying features for the machine learning model to obtain identified features based on the objects and textual analysis of each of the plurality of electronic documents;

presenting information related to each identified feature to the specific user;

obtaining from the specific user a descriptor defining each of the identified features and a value for each of the identified features indicating a relative importance or applicability of each of the identified features;

associating obtained descriptors and values with each of the identified features;

obtaining from the specific user an overall value for each of the plurality of electronic documents indicating an overall applicability of each of the plurality of electronic documents with respect to specific requirements of the specific user;

associating obtained overall values with each of the plurality of electronic documents; and combining the pre-trained, baseline machine learning model, identified features, associated descriptors, associated values, and associated overall values as training data for the machine learning model associated with the specific user;

evaluating the electronic documents by each machine learning model of the plurality of machine learning models based on requirements of the specific user of the plurality of different specific users used to train each of the plurality of machine learning models;

outputting a value or an indication for the electronic documents by each neural network executing one of the plurality of machine learning models;

combining outputs of each neural network with a combiner; and generating a final a score or indication indicating a degree of compliance with combined requirements of the plurality of different specific users based on the combined outputs of the plurality of neural networks.

22. The method of claim 21, wherein each of the plurality of machine learning models is configured to determine that a value associated with an identified feature is an indication of bias; and mitigate the bias during subsequent evaluation of the electronic documents.

23. The method of claim 21, wherein at least one of the plurality of machine learning models is trained based on requirements applicable to each other machine learning model of the plurality of machine learning models, and wherein the electronic documents are evaluated sequentially by the at least one of the plurality of machine learning models and then by the each other machine learning model of the plurality of machine learning models.

24. The method of claim 23, wherein the electronic documents are resumes and the one or more requirements are employment qualifications.

25. The method of claim 23, wherein the requirements applicable to the each other machine learning model of the plurality of machine learning models are general employment qualification for an organization.

26. A method for providing training data for a machine learning model, the method comprising:

obtaining a selection from equipment of a specific user responsive presentation of proposed words according to an A/B test;

identifying, by application of the selection to a dedicated neural network, a pre-trained, baseline machine learning model;

displaying a plurality of electronic documents for evaluation on a display of a computing device to obtain a displayed plurality of electronic documents;

tracking, by an eye movement tracking device, a gaze of the specific user as the specific user reads each of the displayed plurality of electronic documents on the display to determine indications of pauses in reading each of the displayed plurality of electronic documents, wherein the pauses are indicative of the gaze of the specific user;

annotating electronic documents displayed on a display of a computing device with one or more annotations;

correlating objects on the electronic documents to the gaze of the specific user and at least one of the one or more annotations;

identifying features for the machine learning model to obtain identified features based on the gaze of the specific user and annotated objects and textual analysis of each of the electronic documents;

presenting information related to each identified feature to the specific user;

obtaining from the specific user a descriptor defining each of the identified features and a value for each of the identified features indicating a relative importance or applicability of each of the identified features;

associating obtained descriptors and values with each of the identified features;

obtaining from the specific user an overall value for each of the plurality of electronic documents indicating an overall applicability of each of the plurality of electronic documents with respect to specific requirements of the specific user;

associating obtained overall values with each of the plurality of electronic documents; and combining the pre-trained, baseline machine learning model, identified features, associated descriptors, associated values, and associated overall values as training data for the machine learning model associated with the specific user.

27. The method of claim 26, wherein the display is a touch-sensitive display, and wherein the annotating the electronic documents comprises marking up the electronic documents on the touch-sensitive display with a finger or a stylus using consistent mark-up symbols having defined meanings.

28. The method of claim 26, wherein the annotating the electronic documents comprises making audio annotations using a speech recognition engine.

* * * * *